United States Patent
Horng et al.

(10) Patent No.: US 7,609,774 B2
(45) Date of Patent: Oct. 27, 2009

(54) BEAMFORMING TRANSCEIVER ARCHITECTURE WITH ENHANCED CHANNEL ESTIMATION AND FREQUENCY OFFSET ESTIMATION CAPABILITIES IN HIGH THROUGHPUT WLAN SYSTEMS

(75) Inventors: Jyh Chau Horng, Saratoga, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 581 days.

(21) Appl. No.: 11/314,859

(22) Filed: Dec. 20, 2005

(65) Prior Publication Data
US 2007/0140365 A1  Jun. 21, 2007

(51) Int. Cl.
  *H04K 1/10* (2006.01)
  *H04L 27/28* (2006.01)
(52) U.S. Cl. .................. 375/260; 375/295; 455/522
(58) Field of Classification Search ......... 375/259–260, 375/267, 295, 299, 344–345; 455/522, 562.1
See application file for complete search history.

(56) References Cited

U.S. PATENT DOCUMENTS

| | | | |
|---|---|---|---|
| 7,356,017 B2 * | 4/2008 | Codreanu et al. | 370/343 |
| 7,505,529 B2 * | 3/2009 | Kwak et al. | 375/295 |
| 2004/0066761 A1 * | 4/2004 | Giannakis et al. | 370/329 |
| 2005/0143119 A1 * | 6/2005 | Chandra et al. | 455/522 |
| 2005/0185574 A1 * | 8/2005 | Codreanu et al. | 370/208 |
| 2006/0007891 A1 * | 1/2006 | Aoki et al. | 370/334 |
| 2006/0056530 A1 * | 3/2006 | Nakao | 375/260 |
| 2006/0072677 A1 * | 4/2006 | Kwak et al. | 375/260 |
| 2006/0234750 A1 * | 10/2006 | Horng et al. | 455/522 |
| 2006/0234751 A1 * | 10/2006 | Horng et al. | 455/522 |
| 2007/0053452 A1 * | 3/2007 | Koo et al. | 375/260 |
| 2007/0072566 A1 * | 3/2007 | Taira et al. | 455/127.1 |
| 2007/0076752 A1 * | 4/2007 | Zeira et al. | 370/466 |
| 2007/0097946 A1 * | 5/2007 | Mujtaba | 370/349 |
| 2007/0104088 A1 * | 5/2007 | Mujtaba | 370/209 |
| 2007/0104089 A1 * | 5/2007 | Mujtaba | 370/209 |
| 2007/0183541 A1 * | 8/2007 | Moorti et al. | 375/341 |
| 2009/0046807 A1 | 2/2009 | Xia et al. | |
| 2009/0047999 A1 | 2/2009 | Xia et al. | |

OTHER PUBLICATIONS

U.S. Appl. No. 11/110,346, filed Apr. 19, 2005, J. Horng et al.
S.A. Mujtaba, "TGn Sync Proposal Technical Specification," a contribution to IEEE 802.11-04-889r2, Jan. 2005, pp. 1-152.

(Continued)

*Primary Examiner*—Jean B Corrielus
(74) *Attorney, Agent, or Firm*—Kenneth L. Sherman, Esq.; Michael Zarrabian, Esq.; Myers Andras Sherman LLP

(57) ABSTRACT

A method and system for transmitting bit streams in a telecommunication system, by combining a bit stream with a first portion of a preamble, applying power loading to the combined bit stream, applying eigen-steering to the power loaded bit stream, and combining a second portion of the preamble with the eigen-steered bit stream for transmission. The first portion of the preamble includes an HT preamble, and the second portion of the preamble includes a legacy preamble.

27 Claims, 3 Drawing Sheets

OTHER PUBLICATIONS

Thomas M. Cover and Joy A. Thomas, *Elements of Information Theory*, Wiley series in Telecommunications, 1991, pp. 250-256.

Van Veen B.D., Buckley, K.M., "Beamforming: A versatile approach to spatial filtering," ASSP Magazine, IEEE, vol. 5, Iss. 2, Apr. 1988, pp. 4-24.

Foschini, G. et al., "On Limits of Wireless Communications in a Fading Environment When Using Multiple Antennas," Wireless Personal Communication, Mar. 1998, pp. 311-335, vol. 6-Iss. 3, Kluwer Academic Publishers, Netherlands.

Van Veen, B. et al., "Beamforming: A Versatile Approach to Spatial Filtering", IEEE ASSP Magazine, Apr. 1988, pp. 4-24, vol. 5-Iss. 2, IEEE Signal Processing Society, Piscataway, NJ.

Love, D. et al., "Limited Feedback Unitary Precoding for Spatial Multiplexing Systems," IEEE Transactions on Information Theory, Aug. 2005, pp. 2967-2976, vol. 51-Iss. 8, IEEE Information Theory Society.

Narula, A. et al., "Efficient Use of Side Information in Multiple-Antenna Data Transmission over Fading Channels," IEEE Journal on Selected Areas in Communications, Oct. 1998, pp. 1423-1436, vol. 16-Iss. 8, IEEE Communications Society.

Telatar, E., "Capacity of Multi-antenna Gaussian Channels," Bell Laboratories Technical Memorandum, 1995, pp. 1-28.

Xia, P. et al "Design and Analysis of Transmit-Beamforming based on Limited-Rate Feedback," IEEE Transactions on Signal Processing (to appear), Mar. 16, 2005, pp. 1-27.

IEEE 802.11n TG, "Joint Proposal: High throughput extension to the 802.11 Standard: PHY," IEEE 802.11-05/1102r4, Jan. 13, 2006, pp. 1-82.

Enhanced Wireless Consortium (EWC), "HT PHY Specification, v.1.27," Enhanced Wireless Consortium Publication, Dec. 23, 2005, pp. 1-67.

\* cited by examiner

BEAMFORMING TRANSCEIVER ARCHITECTURE WITH ENHANCED CHANNEL ESTIMATION AND FREQUENCY OFFSET ESTIMATION CAPABILITIES IN HIGH THROUGHPUT WLAN SYSTEMS

FIELD OF THE INVENTION

The present invention relates generally to data communication, and more particularly, to data communication in multi-channel communication system such as multiple-input multiple-output (MIMO) systems.

BACKGROUND OF THE INVENTION

A multiple-input-multiple-output (MIMO) communication system employs multiple transmit antennas in a transmitter and multiple receive antennas in a receiver for data transmission. A MIMO channel formed by the transmit and receive antennas may be decomposed into independent channels, wherein each channel is a spatial sub-channel (or a transmission channel) of the MIMO channel and corresponds to a dimension. The MIMO system can provide improved performance (e.g., increased transmission capacity) if the additional dimensionalities created by the multiple transmit and receive antennas are utilized.

MIMO techniques are adopted in wireless standards, such as IEEE802.11n, for high data rate services. In a wireless MIMO system, multiple antennas are used in both transmitter and receiver, wherein each transmit antenna can transmit a different data stream into the wireless channels whereby the overall transmission rate is increased.

There are two types of MIMO systems, known as open-loop and closed-loop. In an open-loop MIMO system, the MIMO transmitter has no prior knowledge of the channel condition (i.e., channel state information). As such, space-time coding techniques are usually implemented in the transmitter to combat fading channels. In a closed-loop system, the channel state information (CSI) can be fed back to the transmitter from the receiver, wherein some pre-processing can be performed at the transmitter in order to separate the transmitted data streams at the receiver side.

Such techniques are referred to as beamforming techniques, which provide better performance in desired receiver's directions and suppress the transmit power in other directions. In fact, beamforming techniques are considered as promising candidates for IEEE 802.11n (high throughput WLAN) standard. In such a system, impairments such as channel estimation errors and frequency offset errors will degrade the system performance significantly. As such, there is a need for a beamforming transceiver architecture which performs processing on the preamble at the transmitter to reduce performance degradation due to the above impairments.

BRIEF SUMMARY OF THE INVENTION

In one embodiment the present invention provides a beamforming transceiver architecture with enhanced channel estimation and frequency offset estimation capabilities in high throughput WLAN systems.

Accordingly, in one example, the present invention provides a method and system for transmitting bit streams in a telecommunication system, by combining a bit stream with a first portion of a preamble, applying power loading to the combined bit stream, applying eigen-steering to the power loaded bit stream, and combining a second portion of the preamble with the eigen-steered bit stream for transmission. The first portion of the preamble includes an HT preamble, and the second portion of the preamble includes a legacy preamble.

The present invention further provides a method and system for receiving the transmission in a receiver that implements: coarse AGC and frequency offset estimation based on the legacy preamble, and fine AGC and frequency offset estimation based on the HT preamble.

These and other features, aspects and advantages of the present invention will become understood with reference to the following description, appended claims and accompanying figures.

DETAILED DESCRIPTION OF THE INVENTION

Under the IEEE 802.11n standard, the transmission of the preamble is in two portions for beamforming mode. The legacy part is transmitted without pre-coding (eigen steering) and the HT (high throughput) part, that uses the same data path as payload, is eigen-steered. In general, the coarse AGC (automatic gain control) and coarse synchronization is achieved through the legacy part for 802.11n systems. An example system is described in S.A. Mutjaba, "TGn Sync Proposal Technical Specification," a contribution to IEEE 802.11-04-889r2, January 2005, (incorporated herein by reference).

Because there is no pre-coding operation on the legacy portion of the preamble in beamforming systems, all the operations, such as coarse AGC and coarse synchronization, can be performed in the time domain, identical to the 802.11a system. For the MIMO part, the HT-STF (High Throughput Short Training Field) is used for fine AGC tuning and HT-LTF (High Throughput Long Training Field) is used for fine synchronization and MIMO channel estimation. Because pre-coding is applied to the HT part of preamble, fine synchronization and MIMO channel estimation need to be performed after post-coding operation at the receiver.

However, in a beamforming system, the MIMO channels are decomposed into several independent channels with the associated eigenvalues of the channel covariance matrix. In general, the receive SNR in each decomposed channel is different because the eigenvalues associated with the decomposed channels are different from each other. Therefore, the frequency offset estimation errors and channel estimation errors will become large when the channel eigenvalues are relatively small.

In other words, the operating SNR at each decomposed channel is different when performing channel estimation and frequency offset estimation. This will degrade the system performance because a packet will be considered as an error packet if any stream contributes to error bits, due to the imperfect frequency offset estimation and channel estimation. This is not the case for the basic MIMO operations because the received power variance among streams will be within a few dBs.

As such, in one embodiment the present invention provides a beamforming transceiver architecture with enhanced channel estimation and frequency offset estimation capabilities in high throughput WLAN systems. The beamforming transceiver architecture performs processing on the preamble at the transmitter to reduce performance degradation due to the above-mentioned impairments.

Figure 1:
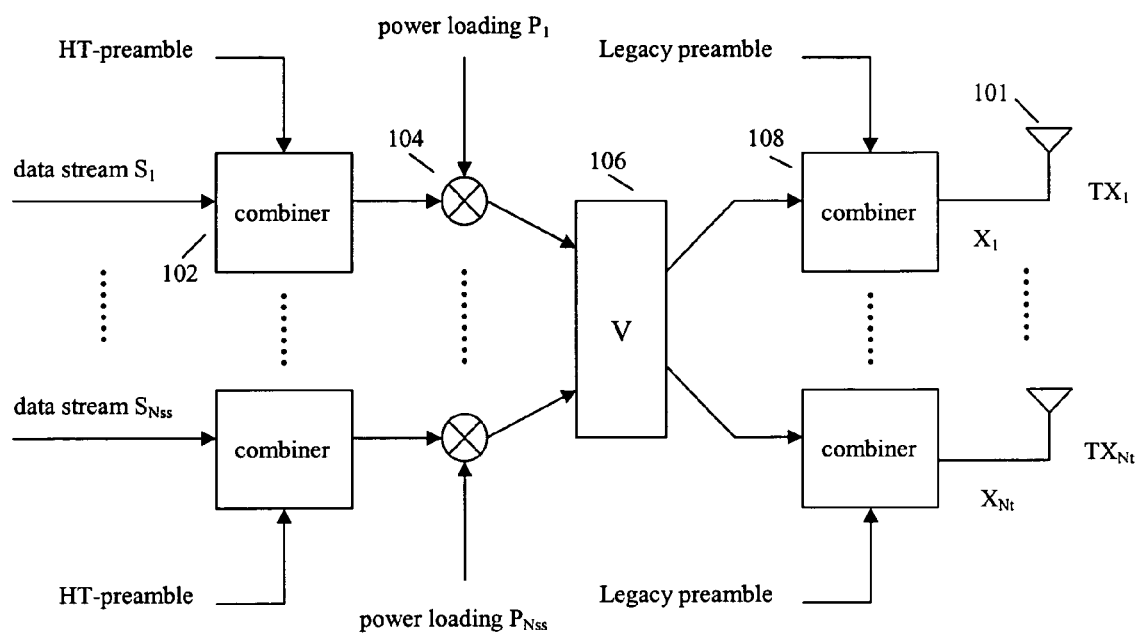
FIG. 1 shows an example block diagram of a beamforming transmitter according to an embodiment of the present invention.

FIG. 1 shows an example block diagram of an embodiment of a transmitter 100 in a beamforming system, according to the present invention. The transmitter comprises multiple data stream processing paths for data streams $S_1 \ldots N_{ss}$, corresponding to transmit antennas 101 (i.e., $TX_1 \ldots TX_{Nt}$). Each data stream processing path includes: a first combiner 102, a multiplier 104, an eigen-steering operation V 106, and a second combiner 108.

In each data stream processing path, the power loadings P are applied to HT preamble together with the data streams. The antenna transmission power loading for each channel can be selected based on channel condition.

As shown in FIG. 1, the coded data streams $S_i$, $i=1, \ldots, N_{ss}$, are combined in the first combiners 102 with HT part of preamble, by padding the preamble to the beginning of the data streams. As described earlier, the HT-preamble portion is used for fine AGC, fine frequency offset estimation, and MIMO channel estimation. Each data stream along with the HT preamble is then adjusted on the power level $P_i$, $i=1, \ldots, N_{ss}$, by multiplying the power loadings $P_i$ in the multipliers 104 before being passed to the eigen-steering operation V 106. The output of the eigen-steering operation is then combined with the legacy preamble in the combiners 108, by padding the legacy preamble to the output of the eigen-steering operation, to generate X (i.e., the transmitted signal or HT portion of preamble) (e.g., $X_1 \ldots X_{Nt}$).

X, the transmitted signal or HT part of preamble, can be expressed as:

$$X=VPS \qquad (1)$$

where X is $N_t \times 1$; V (i.e., eigen-steering matrix at the transmitter) is $N_t \times N_{ss}$; P is a $N_{ss} \times N_{ss}$ diagonal matrix and S (i.e., coded data streams) is $N_{ss} \times 1$. There are a number of algorithms for power loading computations, such as water-filling algorithms, reverse water-filling algorithms, etc. The eigen-steering matrix V is computed from the right singular matrix of the channel matrix H as:

$$H=UDV^H \qquad (2)$$

Figure 2:
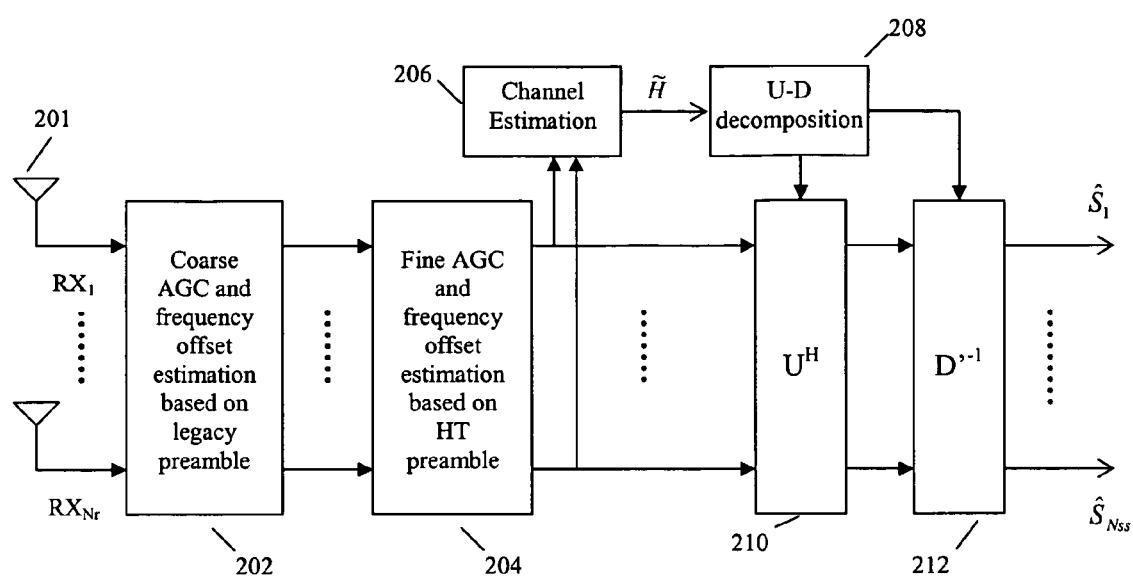
FIG. 2 shows an example block diagram of an embodiment of a beamforming receiver according to the present invention.

The above representation of H is the singular valued decomposition (SVD) of H, wherein U comprises a $N\_r \times N_{ss}$ matrix which is used as a steering matrix at the receiver (e.g., FIG. 2). Further, D comprises a $N_{ss} \times N_{ss}$ diagonal matrix with channel eigenvalues along the diagonal and $(.)^H$ is the Hermitian operation. With $N_r$ receive antennas at a receiver (e.g., receiver 200, FIG. 2), the channel H is a $N_r \times N_t$ matrix. With the additive noise at the receiver, the received signal can be expressed as:

$$Y=HX+n=UDV^H \cdot VPS+n=UDPS+n=\tilde{H}S+n \qquad (3)$$

where $$\tilde{H}=U(DP)=UD' \qquad (4)$$

and n represents noise.

Relation (3) above can be considered as the equivalent input-output relation with the equivalent channel $\tilde{H}$. Since both D and P are diagonal matrices, the product of D and P, or equivalently D', is also a diagonal matrix. Therefore, the matrix U and D' can be computed by U-D decomposing the matrix $\tilde{H}$. For HT preamble, relation (3) is still valid with the replacement of S by the HT preamble symbols, since the HT preamble goes through the same coding chain as the data streams. Therefore, the estimated channel based on the received HT preamble is $\tilde{H}$.

FIG. 2 shows the block diagram of a receiver 200 in a beamforming system, according to the present invention described above. The receiver 200 processes data streams for $N_r$ receive antennas 201 (e.g., $RX_1, \ldots RX_{Nr}$). The receiver 200 comprises coarse AGC and frequency offset estimation unit 202, fine AGC and frequency offset estimation unit 204, channel estimation unit 206, U-D decomposition unit 208, $U^H$ operation unit 210 and $D'^{-1}$ operation unit 212. First the coarse AGC unit 202 performs coarse AGC and synchronization based on the received legacy preamble. Then, the fine AGC unit 204 performs fine AGC and frequency offset estimation based on HT preamble. The channel estimation unit 206 performs synchronization and MIMO channel estimation for $\tilde{H}$ based on the HT preamble. By using U-D decomposition on the estimated $\tilde{H}$ in the U-D unit 208, the matrices U and D' in relation (4) above can be computed. By multiplying $U^H$ and inverse of D' (i.e., $D'^{-1}$) to the received data Y in the units 210 and 212, respectively, from relation (3) above, one can recover the stream S as:

$$D'^{-1}U^H Y=S \qquad (5)$$

Wherein $\hat{S}_1 \ldots \hat{S}_{Nss}$ are estimates of transmitted data streams.

The product of power loading and eigenvalue, or the diagonal terms of the matrix D' in relation (4) above, plays an important role since the operating SNR for each decomposed channel is determined by product of power loading and eigenvalues (i.e., D'). Further, in order for the received HT preambles to have the same SNRS, the reverse water-filling algorithms can be utilized.

It is noted that replacing the eigen-steering matrix V in FIG. 1 by the identity matrix, one can obtain an unbeamformed MIMO transmitter and using the same receiver architecture in FIG. 2 for MIMO detection. Therefore, the transceiver design in FIGS. 1-2 can be used as a general platform for dual modes (beamforming and unbeamformed MIMO) operations.

Figure 3:
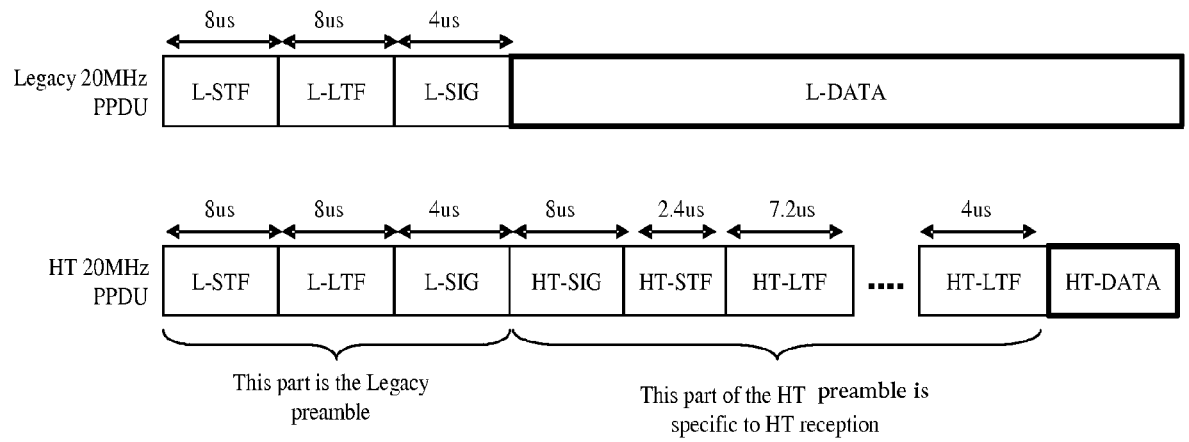
FIG. 3 shows the structure of the high throughput (HT) preamble format.

FIG. 3 shows the structure of the high throughput (HT) preamble format. In FIG. 3, the legacy format is shown above the format of an embodiment of the invention. In the format of an embodiment of the invention, the first part of the preamble is legacy, and the second part of the HT preamble is specific to HT reception.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of transmitting an information signal stream in a telecommunication system, comprising:
   in a wireless communication:
      combining a bit stream with a first portion of a preamble;
      applying power loading to the combined bit stream;
      applying eigen-steering to the power loaded bit stream; and
      combining a second portion of the preamble with the eigen-steered bit stream for transmission.

2. The method of claim 1 wherein the first portion of the preamble comprises a high throughput (HT) preamble.

3. The method of claim 2 wherein the second portion of the preamble comprises a legacy preamble.

4. The method of claim 2 wherein the HT preamble allows fine automatic gain control and fine frequency offset estimation.

5. The method of claim 2 wherein the transmitted signal or HT portion of the preamble is expressed as:

$$X=VPS$$

wherein V represents eigen-steering function, P represents power loading, and S represents coded data streams.

6. The method of claim 5 further comprising transmitting multiple bit streams via a plurality of transmission antennas, wherein:

X comprises a $N_t \times 1$ vector for each transmitted bit stream;
V comprises a $N_t \times N_{ss}$ steering matrix;
P comprises a $N_{ss} \times N_{ss}$ diagonal power-loading matrix;
S comprises a $N_{ss} \times 1$ vector for each input bit stream;
$N_t$ represents the number of transmit antennas; and
$N_{ss}$ represents the number of bit streams.

7. The method of claim 6 wherein a transmission channel is defined by a channel matrix H, such that the eigen-steering matrix V is a function of the right singular matrix of the channel matrix H as:

$$H=UDV^H$$

wherein D is a $N_{ss} \times N_{ss}$ diagonal matrix with channel eigenvalues along the diagonal;
$(.)^H$ is the Hermitian operation;
U comprises a $N_r \times N_{ss}$ matrix which is used as a steering matrix at a receiver.

8. The method of claim 7 further comprising:
receiving a transmitted signal in the receiver having $N_r$ receive antennas, wherein the channel matrix H comprises a $N_r \times N_t$ matrix, such that with an additive noise n at the receiver, the received signal is expressed as:

$$Y=HX+n=UDV^H \cdot VPS+n=UDPS+n=\tilde{H}S+n$$

where $$\tilde{H}=U(DP)=UD',$$

where n represents noise, $\tilde{H}$ represents an estimated channel, and D' represents a diagonal matrix.

9. The method of claim 8 wherein S is replaced by the HT preamble symbols and the matrix U and the matrix D' are computed by U-D decomposing the matrix $\tilde{H}$, such that the estimated channel matrix based on the received HT preamble is $\hat{H}$.

10. The method of claim 3 further comprising receiving the transmission in a receiver, and performing coarse AGC and frequency offset estimation based on the legacy preamble, and fine AGC and frequency offset estimation based on the HT preamble.

11. The method of claim 1 wherein the telecommunication system comprises a wireless orthogonal frequency division multiplexing (OFDM) system.

12. The method of claim 1 further comprising:
transmitting multiple bit streams via multiple channels over a plurality of transmit antennas.

13. The method of claim 12 further comprising:
obtaining channel condition for each channel;
determining said power loading per channel according to channel condition; and
transmitting the bit streams via said multiple channels over the plurality of transmit antennas according to the power loading per channel.

14. The method of claim 1, wherein the wireless communication device comprises a wireless transmitter.

15. The method of claim 14, wherein the wireless transmitter includes a processor coupled to a memory.

16. A telecommunication system for transmitting an information signal stream, comprising:
a transmitter including a first combiner for combining a bit stream with a first portion of a preamble,
a controller for applying power loading to the combined bit stream,
a eigen-steering unit for applying eigen-steering to the power loaded bit stream, and
a second combiner for combining a second portion of the preamble with the eigen-steered bit stream for transmission.

17. The system of claim 16 wherein the first portion of the preamble comprises a high throughput (HT) preamble.

18. The system of claim 16 wherein the second portion of the preamble comprises a legacy preamble.

19. The system of claim 17 wherein the HT preamble allows fine automatic gain control and fine frequency offset estimation.

20. The system of claim 17 wherein the transmitted signal or HT portion of the preamble is expressed as:

$$X=VPS$$

wherein V represents eigen-steering function, P represents power loading, and S represents coded data streams.

21. The system of claim 20 wherein the transmitter transmits multiple bit streams via a plurality of transmission antennas, wherein:

X comprises a $N_t \times 1$ vector for each transmitted bit stream;
V comprises a $N_t \times N_{ss}$ steering matrix;
P comprises a $N_{ss} \times N_{ss}$ diagonal power-loading matrix;
S comprises a $N_{ss} \times 1$ vector for each input bit stream;
$N_t$ represents the number of transmit antennas; and
$N_{ss}$ represents the number of bit streams.

22. The system of claim 21 wherein a transmission channel is defined by a channel matrix H, such that eigen-steering matrix function V is a function of the right singular matrix of the channel matrix H as:

$$H=UDV^H$$

wherein D is a $N_{ss} \times N_{ss}$ diagonal matrix with channel eigenvalues along the diagonal;
$(.)^H$ is the Hermitian operation;
U comprises a $N_r \times N_{ss}$ matrix which is used as a steering matrix at a receiver.

23. The system of claim 22 wherein the receiver is configured
for receiving a transmission signal from the transmitter, the receiver having $N_r$ receive antennas, wherein the channel H comprises a $N_r \times N_t$ matrix, such that with the additive noise n at the receiver, the received signal is expressed as:

$$Y=HX+n=UDV^H \cdot VPS+n=UDPS+n=\tilde{H}S+n$$

where $$\tilde{H}=U(DP)=UD',$$

where n represents noise, $\tilde{H}$ represents an estimated channel, and D' represents a diagonal matrix.

24. The system of claim 23 wherein S is replaced by the HT preamble symbols and the matrix U and the matrix D' are computed by U-D decomposing the matrix $\tilde{H}$, such that the estimated channel matrix based on the received HT preamble is $\tilde{H}$.

25. The system of claim 16 wherein the telecommunication system comprises a wireless orthogonal frequency division multiplexing (OFDM) system.

26. The system of claim 16 wherein the transmitter transmits multiple bit streams via multiple channels over a plurality of transmission antennas, and further obtains channel condition for each channel, determines said power loading per channel according to channel condition, and transmits the bit streams via said multiple channels over the plurality of transmit antennas according to the power loading per channel.

27. The system of claim 18 further comprising a receiver that receives the transmission and performs coarse AGC and frequency offset estimation based on the legacy preamble, and fine AGC and frequency offset estimation based on the HT preamble.

* * * * *